(12) United States Patent
Kobayashi

(10) Patent No.: US 9,016,415 B2
(45) Date of Patent: Apr. 28, 2015

(54) COOLING DEVICE FOR HYBRID VEHICLE

(75) Inventor: Mitsuru Kobayashi, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/884,090

(22) PCT Filed: Feb. 23, 2011

(86) PCT No.: PCT/JP2011/053988
§ 371 (c)(1),
(2), (4) Date: May 8, 2013

(87) PCT Pub. No.: WO2012/114477
PCT Pub. Date: Aug. 30, 2012

(65) Prior Publication Data
US 2013/0220719 A1  Aug. 29, 2013

(51) Int. Cl.
B60K 11/04 (2006.01)
B60K 11/02 (2006.01)
(Continued)

(52) U.S. Cl.
CPC .................. *B60K 11/04* (2013.01); *B60K 11/02* (2013.01); *B60L 3/00* (2013.01); *B60K 2001/003* (2013.01);
(Continued)

(58) Field of Classification Search
CPC ........ B60K 11/00; B60K 11/02; B60K 11/04; B60K 2001/003; B60K 2001/006; F01P 3/00; F01P 11/02; F01P 11/028; F01P 11/0285; F01P 11/0276; F01P 2011/0238; F01P 3/20; F01P 2050/24
USPC ............... 180/68.4, 68.245; 123/41.57, 41.27
See application file for complete search history.

(56) References Cited

U.S. PATENT DOCUMENTS 3,195,294 A * 7/1965 Verdura et al. .................. 96/220
5,031,579 A * 7/1991 Evans ........................... 123/41.2
(Continued)

FOREIGN PATENT DOCUMENTS

JP   11093659 A * 4/1999 ................ F01P 3/12
JP   11107748 A * 4/1999 ................ F01P 3/12
(Continued)

OTHER PUBLICATIONS

Raw machine translation of JP2007-039029.*
(Continued)

*Primary Examiner* — Brodie Follman
*Assistant Examiner* — Steve Clemmons
(74) *Attorney, Agent, or Firm* — Lerner, David, Littenberg, Krumholz & Mentlik, LLP

(57) ABSTRACT

It is an object of the present invention to provide a structure in which the height of an engine hood is reduced and it is easy to discharge the air mixed in a cooling water passage in a cooling device for hybrid vehicle. In the present invention, in a cooling device for hybrid vehicle in which a radiator is arranged in a front part of an engine compartment covered with an engine hood, a generator and a driving motor are arranged behind the radiator, an inverter configured to drive the driving motor is disposed in a space above the driving motor and the generator, the radiator, the inverter, the driving motor, and the generator are connected by a cooling water passage in which cooling water is circulated, and a pressure cap opened at a predetermined pressure and a reserve tank connected to the pressure cap via an overflow pipe are provided in the cooling water passage, the inverter is attached to a vehicle body in a state in which the inverter is inclined forward along the engine hood, a cooling water inlet is provided in a front part of the inverter, a cooling water outlet is provided in a rear part of the inverter, and the pressure cap is disposed in the cooling water outlet.

5 Claims, 3 Drawing Sheets

(51) Int. Cl.
  *B60L 3/00*  (2006.01)
  *B60K 1/00*  (2006.01)

(52) U.S. Cl.
  CPC ........ *B60K 2001/006* (2013.01); *Y10S 903/902* (2013.01); *F01P 2050/24* (2013.01); *B60L 2270/145* (2013.01)

(56) References Cited

U.S. PATENT DOCUMENTS

| | | | | |
|---|---|---|---|---|
| 5,329,889 | A * | 7/1994 | Caldwell | 123/41.54 |
| 5,680,833 | A * | 10/1997 | Smith | 123/41.54 |
| 6,166,498 | A * | 12/2000 | Yamaguchi et al. | 318/34 |
| 6,216,646 | B1 * | 4/2001 | Smith et al. | 123/41.54 |
| 6,467,286 | B2 * | 10/2002 | Hasebe et al. | 62/185 |
| 7,244,293 | B2 * | 7/2007 | Morita et al. | 96/204 |
| 7,284,594 | B2 * | 10/2007 | Sanada et al. | 165/41 |
| 7,395,787 | B1 * | 7/2008 | Claypole et al. | 123/41.01 |
| 7,531,026 | B2 * | 5/2009 | Follette et al. | 95/262 |
| 7,645,330 | B2 * | 1/2010 | Lai et al. | 96/206 |
| 7,878,231 | B2 * | 2/2011 | Akiyama et al. | 165/41 |
| 8,018,103 | B2 * | 9/2011 | Yoshida et al. | 310/58 |
| 8,093,769 | B2 * | 1/2012 | Sonohara | 310/54 |
| 2007/0000638 | A1 * | 1/2007 | Akiyama et al. | 165/41 |
| 2007/0137909 | A1 * | 6/2007 | Zillmer et al. | 180/65.2 |
| 2009/0206709 | A1 * | 8/2009 | Kakuda et al. | 310/68 D |
| 2010/0121508 | A1 * | 5/2010 | Murata et al. | 701/22 |
| 2010/0127583 | A1 * | 5/2010 | Yoshida et al. | 310/59 |
| 2010/0147611 | A1 * | 6/2010 | Amano et al. | 180/68.1 |
| 2010/0243215 | A1 * | 9/2010 | Cimatti et al. | 165/104.31 |
| 2011/0083920 | A1 * | 4/2011 | Mori et al. | 180/68.4 |
| 2011/0114402 | A1 * | 5/2011 | Inoue et al. | 180/65.21 |
| 2011/0290572 | A1 * | 12/2011 | Suzuki | 180/65.22 |
| 2012/0168140 | A1 * | 7/2012 | Yokkoyama et al. | 165/271 |

FOREIGN PATENT DOCUMENTS

| | | |
|---|---|---|
| JP | 2004072933 A | 3/2004 |
| JP | 2006219020 A | 8/2006 |
| JP | 2006226236 A | 8/2006 |
| JP | 2007039029 A | 2/2007 |
| JP | 2008279973 A | 11/2008 |
| JP | 2010144661 A | 7/2010 |
| JP | 2011063168 A1 | 3/2011 |
| WO | WO 2008146902 A1 * | 12/2008 |
| WO | WO 2008156127 A1 * | 12/2008 |
| WO | WO 2009028520 A1 * | 3/2009 |

OTHER PUBLICATIONS

International Search Report dated May 17, 2011 for Application No. PCT/JP2011/053988.

* cited by examiner

COOLING DEVICE FOR HYBRID VEHICLE

CROSS-REFERENCE TO RELATED APPLICATIONS

The present application is a national phase entry under U.S.C. §371 of International Application No. PCT/JP2011/053988 filed Feb. 23, 2011, published in Japanese, and incorporated herein by reference.

TECHNICAL FIELD

The present invention relates to a cooling device for a hybrid vehicle. More specifically, the present invention relates to, in particular, a cooling device for hybrid vehicle that adopts a water cooling system for circulating cooling water for cooling in a hybrid vehicle including two power systems of an engine and a driving motor.

BACKGROUND ART

In a vehicle, for example, a hybrid vehicle (also referred to as "HEV"), to include two power systems, a generator, a driving motor, an inverter, and a battery (also referred to as "battery pack" or "cell") are mounted besides an engine and a fuel tank.

CITATION LIST

Patent Literature

[PTL 1] Japanese Patent Application Laid-Open Publication No. 2006-219020

SUMMARY OF INVENTION

Technical Problem

Incidentally, when a water cooling system for circulating cooling water for cooling is adopted in the hybrid vehicle including the two power systems of the engine and the driving motor in the past, since management temperatures required for the respective two systems are different, and cooling water paths of two systems independent from each other are necessary.

As a result, separate reserve tanks for the cooling water are respectively provided in the cooling water paths of the two systems. Therefore, there is an inconvenience that an increase in the number of components and an increase in inspection places are caused.

In the structure disclosed in PTL 1, an inverter is disposed in an engine compartment in parallel to a vehicle.

As a result, inconveniences explained below occur.
(1) It is likely that a space between a front side portion of the inverter and an engine hood cannot be sufficiently secured.

That is, when the inverter is disposed in the engine compartment covered with the engine hood that inclines forward, if the inverter is disposed in parallel to the vehicle, since the front side portion of the inverter is set close to the engine hood side, the space between the front side portion of the inverter and the engine hood cannot be sufficiently secured.
(2) It is likely that the height of a vehicle front part increases.

That is, since it is necessary to move the engine hood to an upper part of the vehicle in order to secure a fixed space between the front side portion of the inverter and the engine hood, the height of the vehicle front part increases.

(3) It is likely that the air mixed in the cooling water on the inside of the inverter accumulates.

That is, since the inverter is disposed at a position higher than respective motors, the air mixed in the cooling water is likely to accumulate in a cooling water passage on the inside of the inverter.

In the structure in the past, since a pressure cap is not fixedly provided in a rear part of the inverter, an effect of actively discharging the air accumulating in the cooling water passage on the inside of the inverter to the reserve tank is not obtained, unlike in the present invention.

It is an object of the present invention to obtain a structure in which the height of an engine hood is reduced and it is easy to discharge the air mixed in a cooling water passage in a cooling device for a hybrid vehicle.

Solution to Problem

Therefore, in order to eliminate the inconveniences, the present invention provides a cooling device for hybrid vehicle in which a radiator is arranged in a front part of an engine compartment covered with an engine hood, a generator driven by an engine and a driving motor configured to drive a vehicle are arranged behind the radiator, an inverter configured to drive the driving motor is disposed in a space above the driving motor and the generator, the radiator, the inverter, the driving motor, and the generator are connected by a cooling water passage in which cooling water is circulated, and a pressure cap opened at a predetermined pressure and a reserve tank connected to the pressure cap via an overflow pipe are provided in the cooling water passage. In the cooling device for hybrid vehicle, the inverter is attached to a vehicle body in a state in which the inverter is inclined forward along the engine hood, a cooling water inlet is provided in a front part of the inverter, a cooling water outlet is provided in a rear part of the inverter, and the pressure cap is disposed in the cooling water outlet.

Advantageous Effects of Invention

As explained above in detail, according to the present invention, in a cooling device for a hybrid vehicle in which a radiator is arranged in a front part of an engine compartment covered with an engine hood, a generator driven by an engine and a driving motor configured to drive a vehicle are arranged behind the radiator, an inverter configured to drive the driving motor is disposed in a space above the driving motor and the generator, the radiator, the inverter, the driving motor, and the generator are connected by a cooling water passage in which cooling water is circulated, and a pressure cap opened at a predetermined pressure and a reserve tank connected to the pressure cap via an overflow pipe are provided in the cooling water passage, the inverter is attached to a vehicle body in a state in which the inverter is inclined forward along the engine hood, a cooling water inlet is provided in a front part of the inverter, a cooling water outlet is provided in a rear part of the inverter, and the pressure cap is disposed in the cooling water outlet.

Therefore, since the inverter is disposed in the vehicle body in a state in which the inverter is inclined forward along the engine hood that inclines forward, it is possible to arrange the inverter on a lower side of the engine hood without moving the engine hood upward and suppress a disposing position of the engine hood from becoming high.

Compared with a state in which the inverter is fixedly provided in an upper part of the engine and the driving motor (and the generator), in a state in which the inverter is attached to the vehicle body, since the inverter is not directly affected by vibration from the engine (the driving motor and the generator), it is unnecessary to take into account an excess space equivalent to the amplitude of the inverter. Therefore, it is unnecessary to move the inverter to above the engine hood by the excess space.

On the other hand, when the inverter is inclined forward, the cooling water passage on the inside of the inverter can be provided substantially linearly obliquely upward from the cooling water inlet to the cooling water outlet. Therefore, the air mixed in the cooling water tends to gather and accumulate in the rear part of the inverter and the cooling water outlet.

Therefore, the present invention provides a structure in which the cooling water outlet is provided in the rear part of the inverter and the pressure cap is arranged in the cooling water outlet to enable the air to be discharged.

DESCRIPTION OF EMBODIMENTS

Figure 1:
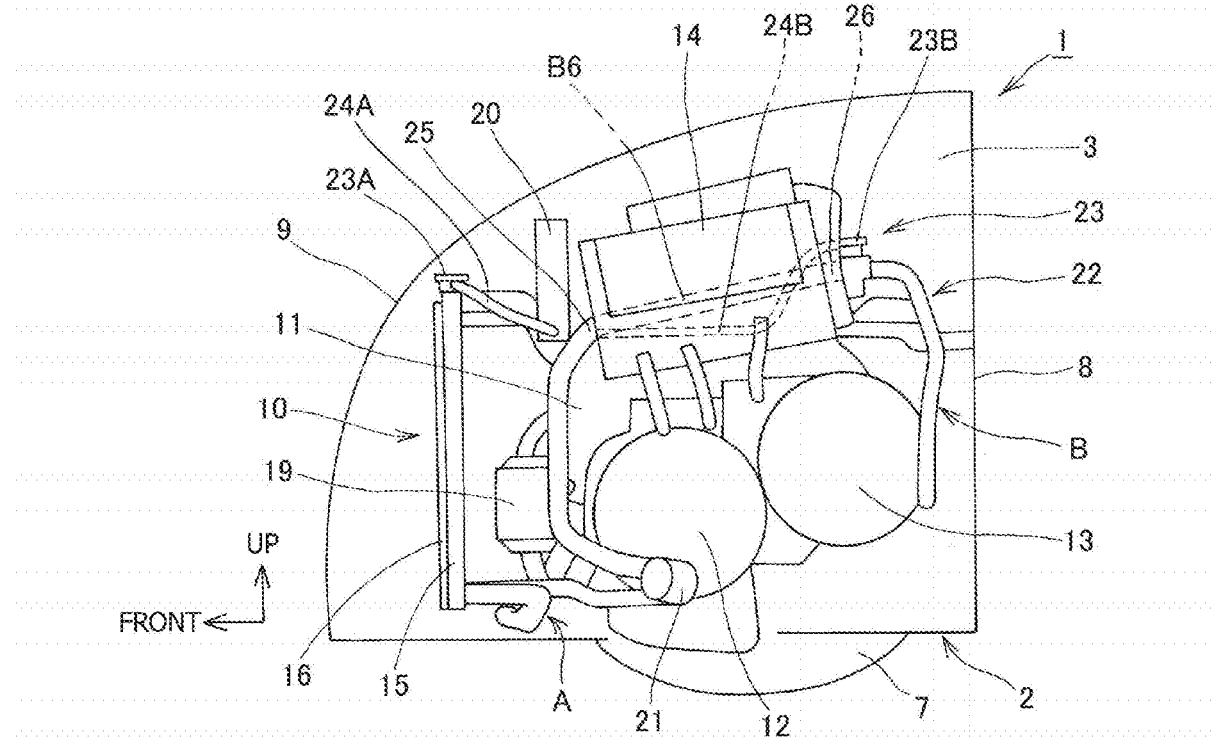
FIG. 1 is a left side view of an engine compartment of a vehicle. (Embodiment)

An embodiment of the present invention is explained in detail on the basis of the drawings.
Embodiment FIGS. 1 to 5 show an embodiment of the present invention.

In FIGS. 1 to 4, reference numeral 1 denotes a hybrid vehicle (also referred to as "vehicle"), 2 denotes a vehicle body, and 3 denotes an engine compartment.

Figure 3:
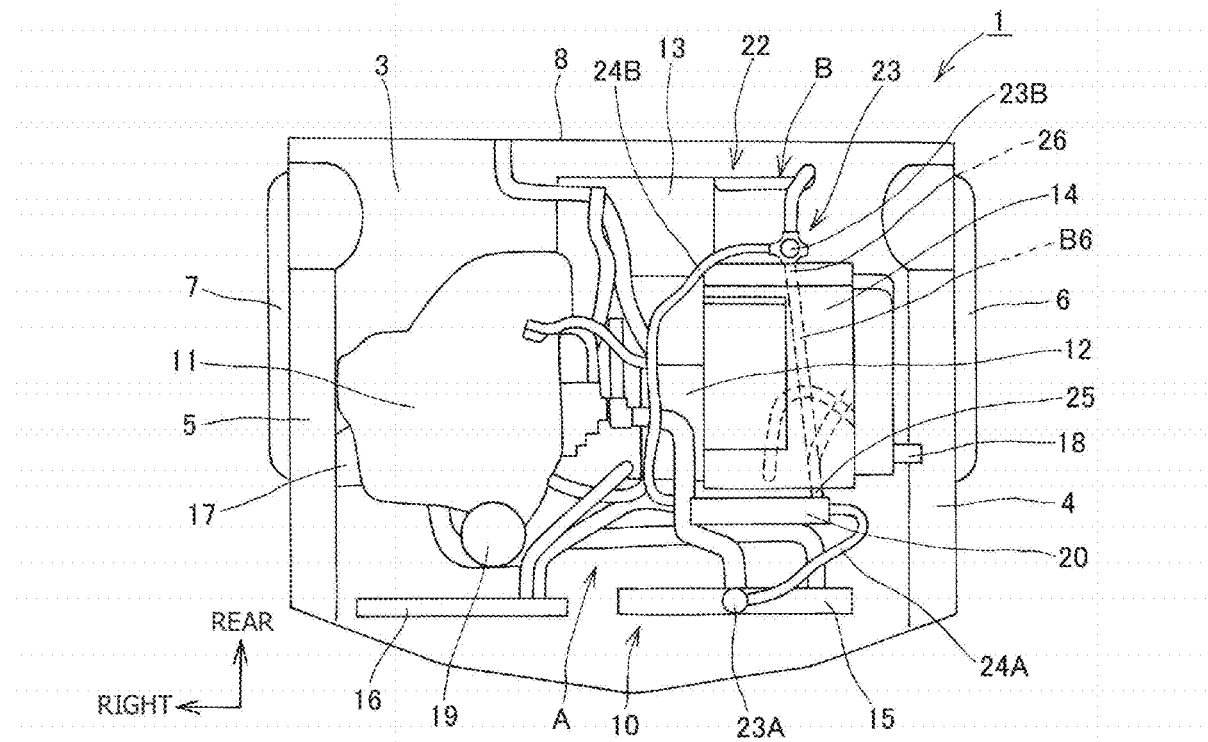
FIG. 3 is a plan view of the engine compartment of the vehicle. (Embodiment)
Figure 4:
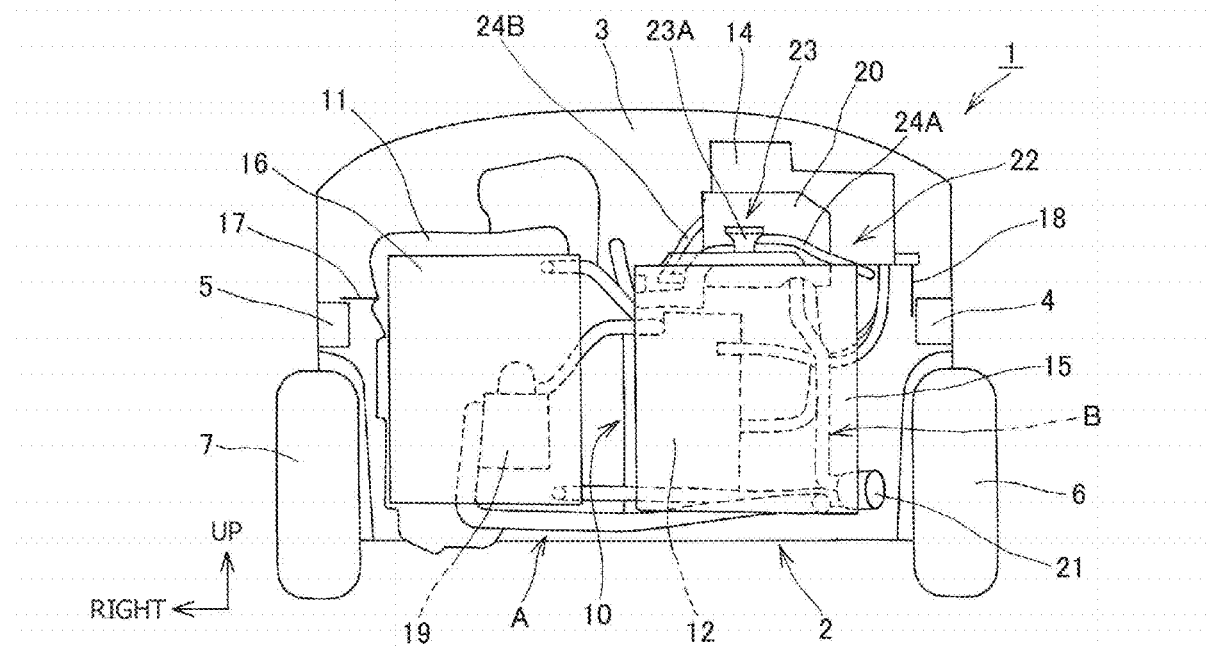
FIG. 4 is a front view of the engine compartment of the vehicle. (Embodiment)

As shown in FIGS. 1, 3, and 4, the engine compartment 3 of the hybrid vehicle 1 is divided by left and right front wheels 6 and 7 of left and right side members 4 and 5 disposed on both the left and right sides of the vehicle body 2 and extending in the vehicle front back direction and a dashboard panel 8. An upper region of the engine compartment 3 is covered with an engine hood 9.

A radiator 10 is arranged in a front part of the engine compartment 3 covered with the engine hood 9. A generator 12 driven by an engine 11 and a driving motor 13 configured to drive the hybrid vehicle 1, which is a vehicle, are disposed behind the radiator 10. An inverter 14 configured to drive the driving motor 13 is disposed in a space above the driving motor 13 and the generator 12.

In this case, the radiator 10 includes an engine radiator (also described as "radiator (for engine)") 15 and an inverter radiator (also described as "radiator (for inverter or motor)") 16.

Figure 2:
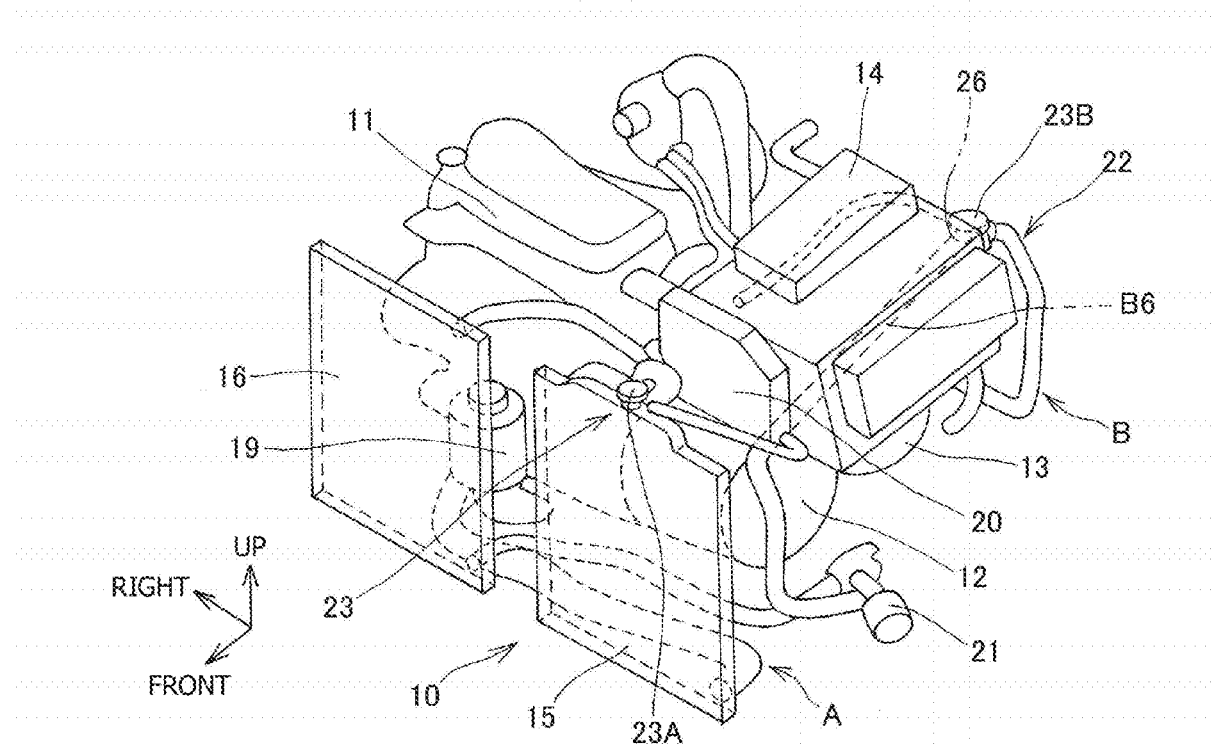
FIG. 2 is a schematic perspective view from an upper part in the left front of the vehicle showing a disposition state of an engine, a generator, a driving motor, an inverter, and a radiator disposed in the engine compartment. (Embodiment)

As shown in FIGS. 2 and 3, the engine radiator 15 is arranged on the vehicle left side in the front part of the engine compartment 3 and, on the other hand, likewise, the inverter radiator 16 is arranged on the vehicle right side in the front part of the engine compartment 3.

As shown in FIGS. 1 to 4, the generator 12 driven by the engine 11 and the driving motor 13 configured to drive the hybrid vehicle 1 are arranged in order behind the engine radiator 15. As shown in FIGS. 1 to 4, the engine 11 is arranged behind the inverter radiator 16.

In this case, the engine 11 is fixed to the right side member 5 by an engine bracket 17 and, on the other hand, the generator 12 is fixed to the left side member 4 by a generator bracket 18.

As shown in FIGS. 1 to 4, the inverter 14 is disposed in the space above the generator 12 and the driving motor 13.

Further, as shown in FIGS. 1 to 4, a catalyst 19 for purifying exhaust gas is arranged on the front side of the engine 11 and behind the inverter radiator 16. As shown in FIGS. 1 to 4, a reserve tank 20 is arranged in the upper front side of the generator 12 and behind the engine radiator 15 and an inverter water pump 21 is arranged on the left side in the vehicle width direction of the generator 12 and the right side in the vehicle width direction of the left front wheel 6.

The engine radiator 15 and the inverter radiator 16 included in the radiator 10, the inverter 14, the driving motor 13, and the generator 12 are connected by a cooling water passage 22 in which cooling water circulates. A pressure cap 23 opened at a predetermined pressure and the reserve tank 20 connected to the pressure cap 23 via an overflow pipe 24 are provided in the cooling water passage 22.

In this case, the inverter 14 is attached to the vehicle body 2 in a state in which the inverter 14 is inclined forward along the engine hood 9. A cooling water inlet 25 is provided in a front part of the inverter 14. A cooling water outlet 26 is provided in a rear part of the inverter 14. The pressure cap 23 is disposed in the cooling water outlet 26.

Figure 5:
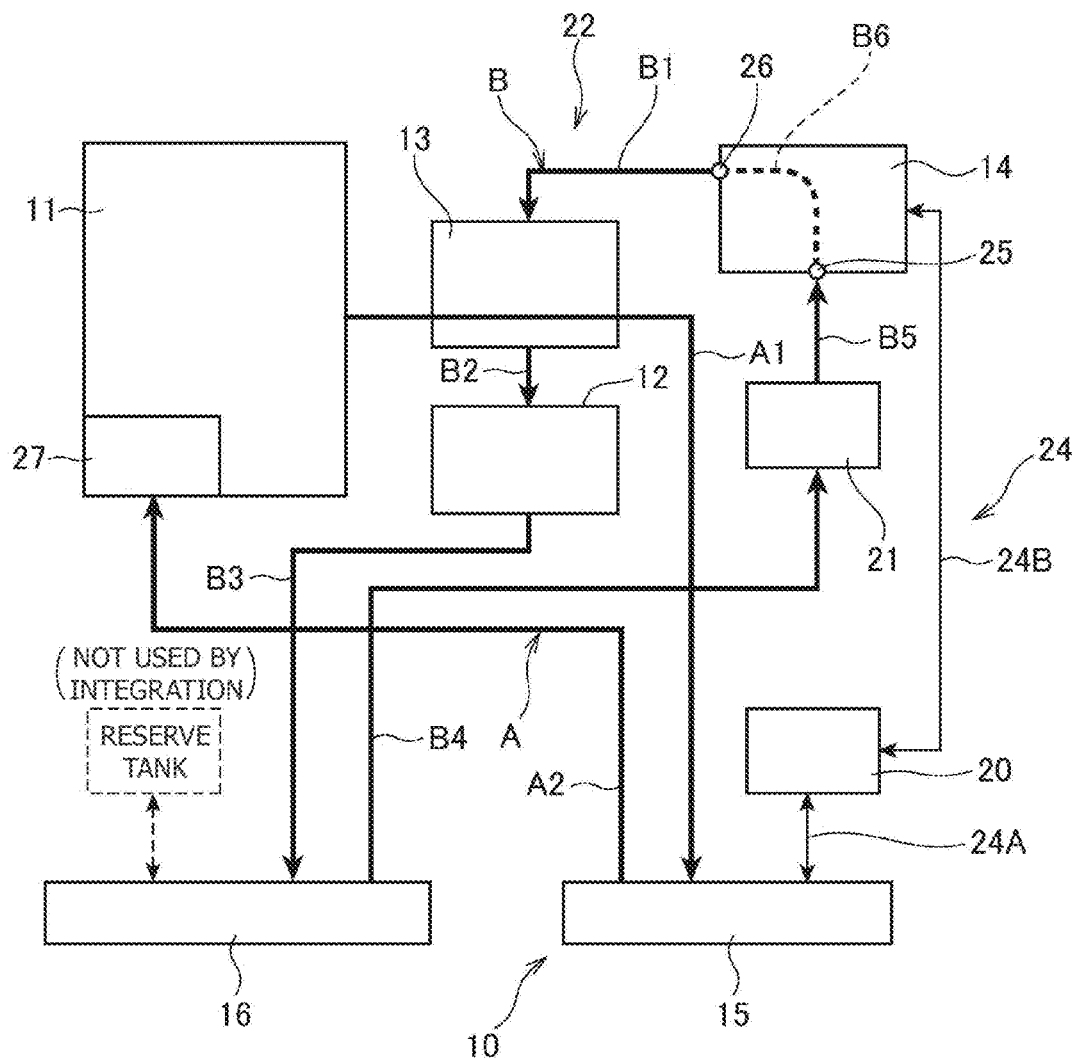
FIG. 5 is a diagram showing a cooling water path of a cooling device for hybrid vehicle. (Embodiment)

More specifically, as shown in FIG. 5, the cooling water passage 22 includes an engine cooling water passage A for cooling the engine 11 and an inverter cooling water passage B for cooling the inverter 14.

As shown in FIG. 5, the overflow pipe 24 includes an engine overflow pipe 24A and an inverter overflow pipe 24B.

As shown in FIG. 5, the engine cooling water passage A includes an engine first cooling water passage A1 for feeding the cooling water from the engine 11 to the engine radiator 15 and an engine second cooling water passage A2 for returning the cooling water from the engine radiator 15 to the engine 11.

In the engine cooling water passage A, as shown in FIG. 5, an engine water pump 27 is arranged in the engine 11.

Consequently, as shown in FIG. 5, the cooling water from the engine 11 flows to the engine radiator 15 through the engine first cooling water passage A1 and the cooling water from the engine radiator 15 returns to the engine 11 via the engine water pump 27 through the engine second cooling water passage A2. This circulation of the cooling water is repeated.

Furthermore, as shown in FIG. 1, the pressure cap 23 includes an engine pressure cap 23A and an inverter pressure cap 23B.

In this case, in the engine radiator 15, in an upper part of which the engine pressure cap 23A is arranged, the engine overflow pipe 24A for connecting the engine radiator 15 and the reserve tank 20 is provided.

As shown in FIG. 5, the inverter cooling water passage B includes an inverter first cooling water passage B1 for feeding the cooling water from the cooling water outlet 26 of the inverter 14 to the driving motor 13, an inverter second cooling water passage B2 for feeding the cooling water from the driving motor 13 to the generator 12, an inverter third cooling water passage B3 for feeding the cooling water from the generator 12 to the inverter radiator 16, an inverter fourth cooling water passage B4 for returning the cooling water from the inverter radiator 16 to the water pump 21, an inverter fifth cooling water passage B5 for pumping the cooling water from the water pump 21 to the cooling water inlet 25 of the inverter 14, and an inverter sixth cooling water passage B6 for connecting the cooling water inlet 25 and the cooling water outlet 26 on the inside of the inverter 14.

Consequently, as shown in FIG. 5, the cooling water from the cooling water outlet 26 of the inverter 14 flows to the driving motor 13 through the inverter first cooling water passage B1. The cooling water from the driving motor 13 flows to the generator 12 through the inverter second cooling water passage B2. The cooling water from the generator 12 flows to the inverter radiator 16 through the inverter third cooling water passage B3. The cooling water from the inverter radiator 16 flows to the water pump 21 through the inverter fourth cooling water passage B4. The cooling water from the water pump 21 flows to the cooling water inlet 25 of the inverter 14 through the inverter fifth cooling water passage B5. The cooling water reaching the cooling water inlet 25 of the inverter 14 flows to the cooling water outlet 26 through the inverter sixth cooling water passage B6 on the inside of the inverter 14. This circulation of the cooling water is repeated.

In this case, the inverter overflow pipe 24B for connecting the inverter 14 and the reserve tank 20 is provided in the inverter 14.

That is, in the embodiment of the present invention, as indicated by a broken line in FIG. 5, a second reserve tank used in the past is not used and integrated with one reserve tank 20 to eliminate inconveniences of an increase in the number of components and an increase in inspection places.

As shown in FIG. 1, when the inverter 14 is attached to the vehicle body 2 in the state in which the inverter 14 is inclined forward along the engine hood 9, the cooling water inlet 25 is provided in the front part of the inverter 14, the cooling water outlet 26 is provided in the rear part of the inverter 14, and the inverter pressure cap 23B is disposed in the cooling water outlet 26.

Consequently, since the inverter 14 is disposed in the vehicle body 2 in the state in which the inverter 14 is inclined forward along the engine hood 9 that inclines forward, as shown in FIG. 1, it is possible to arrange the inverter 14 on the lower side of the engine hood 9 without moving the engine hood 9 upward and suppress a disposing position of the engine hood 9 from becoming high.

Compared with a state in which the inverter 14 is fixedly provided in an upper part of the engine 11 and the driving motor 13 (and the generator 12), in a state in which the inverter 14 is attached to the vehicle body 2, since the inverter 14 is not directly affected by vibration from the engine 11 (the driving motor 13 and the generator 12), it is unnecessary to take into account an excess space equivalent to the amplitude of the inverter 14. Consequently, it is unnecessary to move the inverter 14 to above the engine hood 9 by the excess space.

On the other hand, when the inverter 14 is inclined forward, as shown in FIG. 1, the inverter sixth cooling water passage B6 on the inside of the inverter 14 can be provided substantially linearly obliquely upward from the cooling water inlet 25 to the cooling water outlet 26. Therefore, the air mixed in the cooling water tends to gather and accumulate in the rear part of the inverter 14 and the cooling water outlet 26.

Therefore, in the present invention, as shown in FIGS. 1 to 3, the cooling water outlet 26 is provided in the rear part of the inverter 14 and the inverter pressure cap 23B is arranged in the cooling water outlet 26 to efficiently discharge the air.

Furthermore, as shown in FIG. 1, the inverter pressure cap 23B is disposed in a highest position in the vertical direction in the inverter sixth cooling water passage B6 of the inverter cooling water passage B.

Consequently, as shown in FIG. 1, the air mixed in the cooling water gathers toward the inverter pressure cap 23B disposed in the highest position in the vertical direction in the inverter sixth cooling water passage B6.

Accordingly, it is possible to efficiently discharge the air accumulating in the inverter sixth cooling water passage B6 to the reserve tank 20 through the single inverter pressure cap 23B.

Therefore, it is possible efficiently discharge the air on the inside of not only the inverter sixth cooling water passage B6, which communicates with the inside of the inverter 14, but also the entire inverter cooling water passage B to the reserve tank 20.

The present invention is not limited to the embodiment, and various applications and modifications are possible.

For example, in the embodiment of the present invention, the overflow pipe includes the two systems of the engine overflow pipe and the inverter overflow pipe. As a modification of this configuration, it is also possible to adopt a special configuration in which the overflow pipe, one end of which communicates with the reserve tank, is divided halfway using a dividing component such as a 3-way component, one divided pipe is used as an engine overflow pipe, the other divided pipe is used as an inverter overflow pipe, and connecting parts of the reserve tank is integrated into one connecting part.

With this configuration, since the overflow pipes are integrated into one overflow pipe in a peripheral region of the reserve tank, it is possible to secure a space in the peripheral region of the reserve tank. This contributes to improvement of workability of attachment and detachment of the overflow pipe.

If a special configuration in which a partition is provided in the reserve tank is adopted, even when cooling waters in two systems including engine cooling water and inverter cooling water are different, it is possible to handle the cooling waters with the one integrated reserve tank. Consequently, it is unlikely that inconveniences of an increase in the number of components and an increase in inspection places due to the two reserve tanks in the past are caused.

REFERENCE SIGNS LIST 1 hybrid vehicle (also referred to as "vehicle")
2 vehicle body
3 engine compartment
4 left side member
5 right side member
8 dashboard panel
9 engine hood
10 radiator
11 engine
12 generator
13 driving motor
14 inverter
15 engine radiator
16 inverter radiator
20 reserve tank
21 inverter water pump
22 cooling water passage
23 pressure cap
23A engine pressure cap
23B inverter pressure cap
24 overflow pipe
24A engine overflow pipe
24B inverter overflow pipe
25 cooling water inlet 26 cooling water outlet
A engine cooling water passage
A1 engine first cooling water passage
A2 engine second cooling water passage
B inverter cooling water passage
B1 inverter first cooling water passage
B2 inverter second cooling water passage
B3 inverter third cooling water passage
B4 inverter fourth cooling water passage
B5 inverter fifth cooling water passage
B6 inverter sixth cooling water passage

The invention claimed is:

1. A cooling device for a hybrid vehicle comprising:
a radiator including an engine radiator and an inverter radiator;
an engine, a generator driven by the engine, and a driving motor configured to drive the vehicle, wherein the engine, the generator and the driving motor are arranged behind the radiator;
an inverter configured to drive the driving motor, wherein the inverter is disposed in a space above the driving motor and the generator, and wherein the inverter is inclined forward along the engine hood;
an engine cooling water passage for connecting the engine radiator and the engine;
an inverter cooling water passage for connecting the inverter radiator, an inverter water pump, the inverter, the driving motor, and the generator, including:
a first inverter cooling water passage for feeding the cooling water from a cooling water outlet of the inverter to the driving motor;
a second inverter cooling water passage for feeding the cooling water from the driving motor to the generator;
a third inverter cooling water passage for feeding the cooling water from the generator to the inverter radiator;
a fourth inverter cooling water passage for returning the cooling water from the inverter radiator to the inverter water pump;
a fifth inverter cooling water passage for pumping the cooling water from the water pump to a cooling water inlet of the inverter; and
a sixth inverter cooling water passage for connecting the cooling water inlet and the cooling water outlet on the inside of the inverter;
a pressure cap opened at a predetermined pressure; and
a reserve tank connected to the pressure cap via an inverter overflow pipe;
wherein the cooling water inlet is positioned in a first part of the inverter, the
cooling water outlet is positioned in a second part of the inverter, and the pressure cap is disposed in the cooling water outlet;
wherein the sixth inverter cooling water passage is disposed inside the inverter and positioned substantially linearly obliquely upward from the cooling water inlet to the cooling water outlet.

2. The cooling device of claim 1, wherein the first inverter cooling water passage and the fifth inverter cooling water passage are disposed in a vertical direction.

3. The cooling device of claim 1, wherein the pressure cap is disposed in the cooling water outlet and is disposed in the highest position in a vertical direction in the inverter cooling water passage.

4. The cooling device of claim 1, wherein the radiator is arranged in a front part of an engine compartment covered with an engine hood.

5. The cooling device of claim 1, wherein the engine cooling water passage and the inverter cooling water passage circulate cooling water.

* * * * *